US012570148B2

(12) United States Patent
Moneypenny et al.

(10) Patent No.: US 12,570,148 B2
(45) Date of Patent: Mar. 10, 2026

(54) ACCESSORY MANAGEMENT SYSTEM THAT IDENTIFIES ACCESSORIES TO ALLOW FOR CONNECTION

(71) Applicant: Ford Global Technologies, LLC, Dearborn, MI (US)

(72) Inventors: Stephen Moneypenny, San Diego, CA (US); Bradford Zercoe, San Jose, CA (US); Amil Vira, Irvine, CA (US); Justin Yang, Boise, ID (US); Luis Alberto Duran Hernandez, Mexico City (MX); Shane Patton, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 18/583,003

(22) Filed: Feb. 21, 2024

(65) Prior Publication Data

US 2025/0262933 A1 Aug. 21, 2025

(51) Int. Cl.
| | |
|---|---|
| *B60K 35/10* | (2024.01) |
| *B60R 11/00* | (2006.01) |
| *B60R 16/023* | (2006.01) |

(52) U.S. Cl.
CPC ............ *B60K 35/10* (2024.01); *B60R 16/023* (2013.01); *B60R 2011/0007* (2013.01)

(58) Field of Classification Search
CPC .................. B60K 35/10; B60R 16/023; B60R 2011/0007; B60R 16/0231
See application file for complete search history.

(56) References Cited

U.S. PATENT DOCUMENTS

| | | | |
|---|---|---|---|
| 5,338,081 | A | 8/1994 | Young et al. |
| 6,116,674 | A | 9/2000 | Allison et al. |
| 7,029,048 | B1 * | 4/2006 | Hicks ..................... B60N 3/101 |
| | | | 296/193.04 |
| 11,358,531 | B2 | 6/2022 | Heinz et al. |
| 11,370,339 | B2 * | 6/2022 | Ketels ..................... B60N 2/78 |
| 2005/0035618 | A1 | 2/2005 | Toth et al. |
| 2007/0194582 | A1 | 8/2007 | Arbaugh et al. |
| 2007/0296234 | A1 | 12/2007 | Sturt et al. |
| 2008/0007079 | A1 | 1/2008 | Sturt et al. |
| 2024/0149691 | A1 * | 5/2024 | Salter ..................... B60L 53/66 |
| 2025/0001957 | A1 * | 1/2025 | Glaser ................... B60K 35/50 |

* cited by examiner

*Primary Examiner* — James J Lee
*Assistant Examiner* — Alexander George Matta
(74) *Attorney, Agent, or Firm* — Vichit Chea; Price Heneveld LLP

(57) ABSTRACT

A vehicle includes a center console that includes an interface. At least one accessory is configured for installation to the center console via the interface and including an identifier. A detection circuit is configured to detect a user approaching the vehicle. An identification circuit is configured to determine the identifier in response to a scanning command. A display indicates instructions for the installation of the at least accessory in response to an indication signal. Control circuitry is in communication with the detection circuit, the identification circuit, and the display, and is configured to communicate the scanning command in response to detection of the user approaching the vehicle and communicate the indication signal based on detection of the identifier.

18 Claims, 7 Drawing Sheets

Install front center console bin from passenger side

600

ACCESSORY MANAGEMENT SYSTEM THAT IDENTIFIES ACCESSORIES TO ALLOW FOR CONNECTION

FIELD OF THE DISCLOSURE

The present disclosure generally relates to accessory management for a vehicle and, more particularly, to an accessory management system that identifies different types of accessories to selectively allow connection with a center console of the vehicle.

BACKGROUND OF THE DISCLOSURE

Conventional storage management arrangements for a vehicle can have limited adaptability.

SUMMARY OF THE DISCLOSURE

According to a first aspect of the present disclosure, a vehicle includes a center console that includes an interface. At least one accessory is configured for installation to the center console via the interface and including an identifier. A detection circuit is configured to detect a user approaching the vehicle. An identification circuit is configured to determine the identifier in response to a scanning command. A display indicates instructions for the installation of the at least accessory in response to an indication signal. Control circuitry is in communication with the detection circuit, the identification circuit, and the display, and is configured to communicate the scanning command in response to detection of the user approaching the vehicle and communicate the indication signal based on detection of the identifier.

Embodiments of the first aspect of the present disclosure can include any one or a combination of the following features:

wherein the control circuitry is configured to compare the identifier to identification information corresponding to compatible accessories and classify the at least one accessory as compatible or incompatible based on the comparison;

wherein the control circuitry is configured to communicate the indication signal further in response to classification of the at least one accessory as compatible;

a light configured to illuminate an area proximate to the console assembly that receives the at least one accessory in response to classification of the at least one accessory as compatible;

a sensing circuit that detects alignment of the at least one accessory with the interface, wherein the interface includes a mechanical interface configured to lock the at least one accessory to the center console in response to alignment of the at least one accessory with the interface and classification of the at least one accessory as compatible;

wherein the control circuitry is configured to limit activation of the mechanical interface in response to alignment of the at least one accessory with the interface and classification of the at least one accessory as incompatible;

wherein the interface includes an electrical interface that electrically couples at least one accessory with the control circuitry, wherein the control circuitry is configured to control an electrical component of the accessory when the at least one accessory is locked with the interface;

wherein the display is configured to indicate incompatibility in response to classification of the at least one accessory as incompatible;

wherein the control circuitry is in communication with a server remote from the vehicle that determines software update availability in response to an update request, wherein the control circuitry is configured to communicate the update request in response to classification of the at least one accessory as compatible;

wherein the control circuitry is configured to determine an incompatibility source as outdated or unknown and communicate the update request in response to determination of the incompatibility source as outdated; and a climate control system, wherein the interface includes a port in fluid communication with the climate control system and configured to provide climate-controlled air into the at least one accessory when the at least one accessory is connected to the interface.

According to a second aspect of the present disclosure, a vehicle includes a center console that includes an interface, at least one accessory configured for installation to the center console via the interface and including an identifier, a detection circuit configured to detect a user approaching the vehicle, an identification circuit configured to determine the identifier in response to a scanning command, a display that indicates instructions for the installation of the at least accessory in response to an indication signal, and control circuitry in communication with the detection circuit, the identification circuit, and the display. The control circuitry is configured to communicate the scanning command in response to detection of the user approaching the vehicle, communicate the indication signal based on detection of the identifier, compare the identifier to identification information corresponding to compatible accessories, classify the at least one accessory as compatible or incompatible based on the comparison.

Embodiments of the second aspect of the present disclosure can include any one or a combination of the following features:

wherein the control circuitry is configured to communicate the indication signal further in response to classification of the at least one accessory as compatible;

a light configured to illuminate an area proximate to the console assembly that receives the at least one accessory in response to classification of the at least one accessory as compatible;

a sensing circuit that detects alignment of the at least one accessory with the interface, wherein the interface includes a mechanical interface configured to lock the at least one accessory to the center console in response to alignment of the at least one accessory with the interface and classification of the at least one accessory as compatible;

the control circuitry is configured to limit activation of the mechanical interface in response to alignment of the at least one accessory with the interface and classification of the at least one accessory as incompatible;

the interface includes an electrical interface that electrically couples at least one accessory with the control circuitry, wherein the control circuitry is configured to control an electrical component of the accessory when the at least one accessory is locked with the interface; and the display is configured to indicate incompatibility in response to classification of the at least one accessory as incompatible.

According to a third aspect of the present disclosure, a vehicle includes a center console that includes an interface, at least one accessory configured for installation to the center console via the interface and including an identifier, an identification circuit configured to determine the identifier in response to a scanning command, a display that indicates instructions for the installation of the at least accessory in response to an indication signal, and control circuitry in communication with the identification circuit and the display. The control circuitry is configured to communicate the scanning command, compare the identifier to identification information corresponding to compatible accessories, classify the at least one accessory as compatible or incompatible based on the comparison, and communicate the indication signal based on detection of the identifier.

Embodiments of the third aspect of the present disclosure can include any one or a combination of the following features:

wherein the control circuitry is in communication with a server remote from the vehicle that determines software update availability in response to an update request, wherein the control circuitry is configured to communicate the update request in response to classification of the at least one accessory as compatible.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
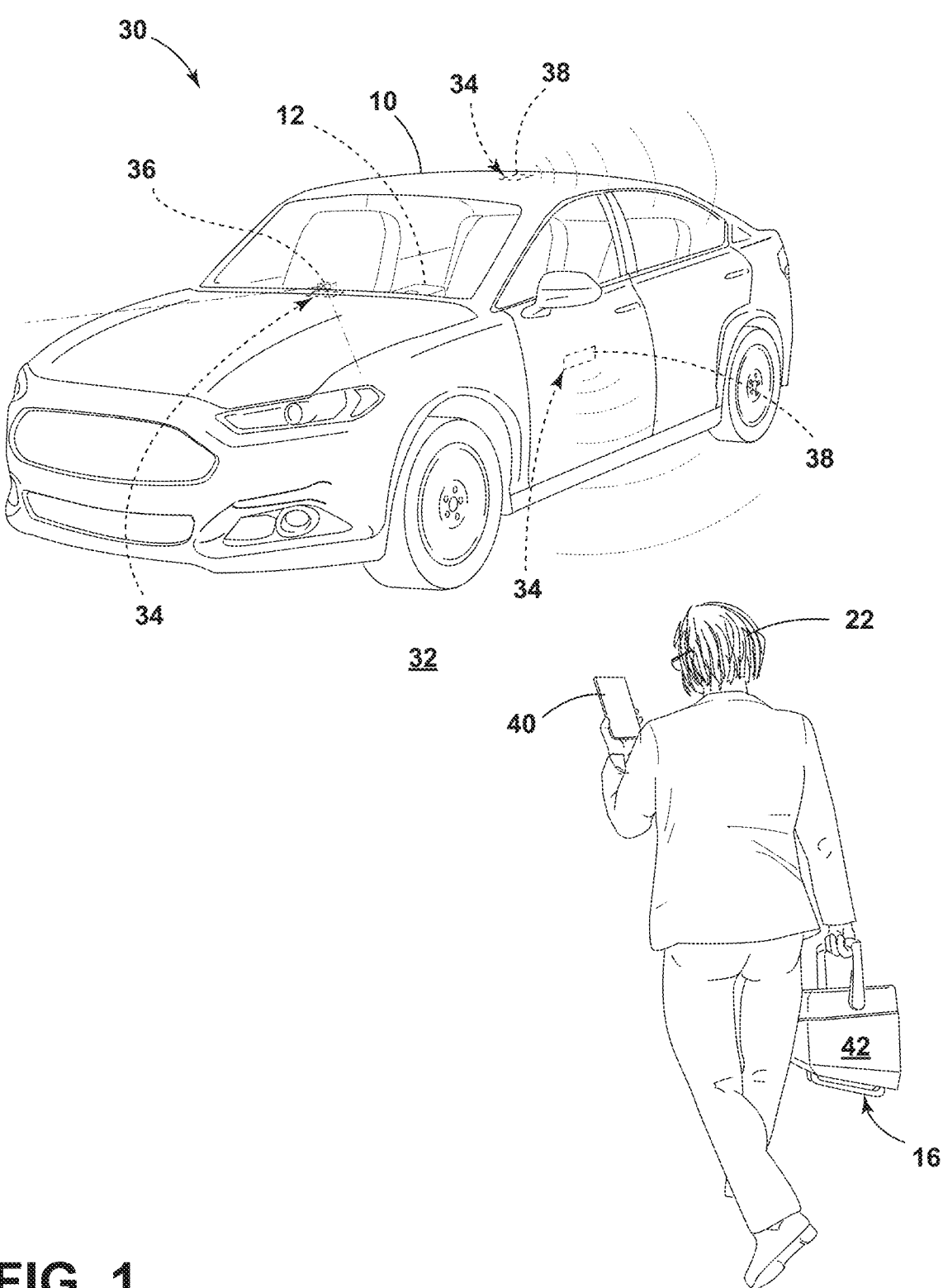
FIG. 1 is a perspective view of a user approaching a vehicle holding an accessory configured to interact with a center console of the vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related accessory management for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Generally referring to the figures, the present systems and methods provide for dynamic docking of various removable devices in a vehicle environment. Further, the present disclosure provides for enhanced operability management of the removable devices and connections thereto. The present disclosure also provides for electrical, mechanical, and/or fluid communication between to the removable device when the removable device is installed. Lastly, the present disclosure provides for software management for controlling interaction between the removable device and the vehicle environment.

Referring generally to FIGS. 1-7, a vehicle 10 includes a center console 12 that includes an interface 14. At least one accessory 16 is configured for installation to the center console 12 via the interface 14 and includes an identifier 18. A detection circuit 20 is configured to detect a user 22 approaching the vehicle 10. An identification circuit 24 is configured to determine the identifier 18 in response to a scanning command. A display 26 indicates instructions for the installation of the at least one accessory 16 in response to an indication signal. The vehicle 10 includes control circuitry 28 in communication with the detection circuit 20, the identification circuit 24, and the display 26. The control circuitry 28 is configured to communicate the scanning command in response to detection of the user 22 approaching the vehicle 10. The control circuitry 28 is also configured to communicate the indication signal based on detection of the identifier 18.

Referring now to FIG. 1, a management system 30 for one or more accessories 16 is demonstrated in a vehicle environment. The vehicle environment includes a vehicle 10 and a region 32 external to the vehicle 10 that may be scanned or otherwise monitored by one or more detectors 34, such as cameras 36, proximity sensors 38, radio frequency antennas, or any other wireless detection device that is configured to detect a user 22 approaching the vehicle 10 in the region 32 external to the vehicle 10. For example, the user 22 may carry or equip an electronic device, such as a mobile device 40 (e.g., a smartphone), a key for the vehicle 10 having wireless communication features (e.g., Bluetooth®, Zig-bee®, Z-wave®, etc.), or any other electronic device that may be detected by the detector. In this way, the user 22 may be detected as approaching the vehicle 10. In response to detection of the user 22 approaching the vehicle 10, various functions may be carried out automatically, such as unlock-ing the vehicle 10. In one example that will be described herein, the management system 30 may initiate a wake-up sequence for actively sensing or detecting one or more accessories 16 for installation into the vehicle 10. The mobile device 40 may be communicatively coupled with the vehicle 10 via one or more network(s), which may commu-nicate via one or more wireless connection(s), and/or may connect with the vehicle 10 directly using Near Field Communication (NFC) protocols, Bluetooth® protocols, Wi-Fi, Ultra-Wide Band (UWB), and other possible data connection and sharing techniques.

It is contemplated that, while the accessory 16 shown and described herein is a container 42 (e.g., a portable cooler), the accessory 16 may include any other accessory 16 for interaction with the center console 12 that may be selec-tively removed from the center console 12. For example, charging devices, coolers, removable warming compart-ments, audio devices, or any other device that can interact with the center console 12 may be managed by the present management system 30.

Figure 2:
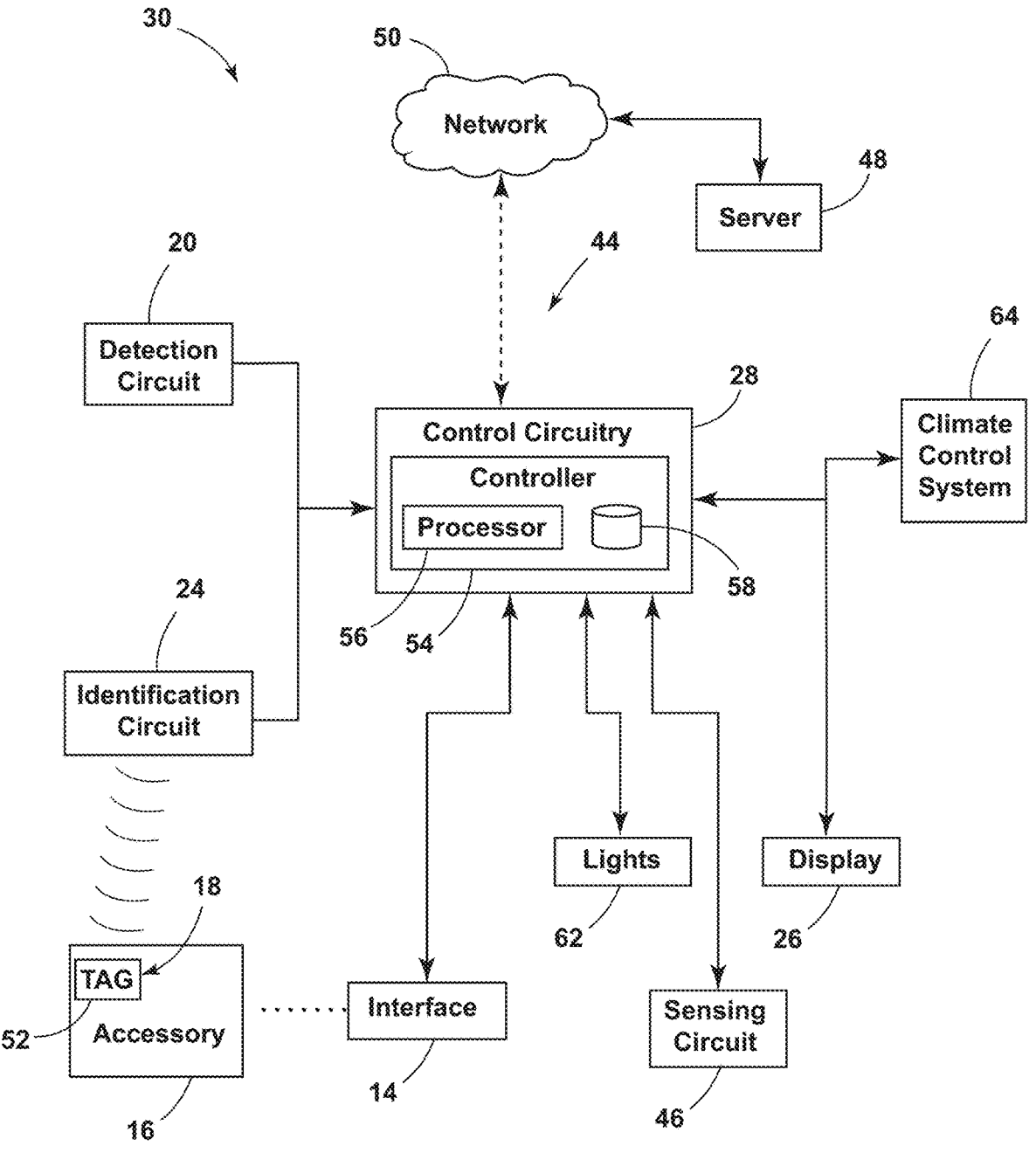
FIG. 2 is a functional block diagram of an accessory management system for a vehicle.

Referring now to FIG. 2, the management system 30 includes an accessory management circuit 44 that includes a detection circuit 20, an identification circuit 24, a sensing circuit 46, and control circuitry 28 local to the vehicle 10 and in communication with a server 48 remote from the vehicle 10. For example, the communication circuitry may be com-municatively coupled with a network 50, such as a wireless network 50, that allows for data transfer for updating various portions of the management system 30. By way of example, the server 48 may be configured to push updates to the control circuitry 28 based on software revisions and/or software levels of the control circuitry 28, the detection circuit 20, the identification circuit 24, or any other soft-ware-based circuitry of the management system 30. Accord-ingly, the server 48 may be operable to update detection, identification, or control of the management system 30 to optimally manage interaction with the accessory 16.

As previously described, one or more detectors may be configured to detect the user 22 approaching the vehicle 10. Accordingly, the detection system may include the detectors and circuitry configured to process signals from the detec-tors to determine a user 22 approaching the vehicle 10. For example, an image processor 56 may be provided for processing images captured by a camera that monitors the region 32 external to the vehicle 10 and classifies objects (e.g., the user 22, the accessory 16).

With continued reference to FIG. 2, the identification circuit 24 includes wireless communication features that are configured to detect and/or identify the accessory 16 in response to activation by the control circuitry 28. The identification circuit 24 can include any wireless communi-cation protocol but, in an exemplary embodiment, includes radio frequency identification (RFID) and is configured to identify the accessory 16 based on unique signal identifiers exchanged between the accessory 16 and the identification circuit 24. For example, an RFID tag 52 or other RFID circuitry may be operably coupled with the accessory 16 to allow the identification circuit 24 to identify a make, model, type, or any other identifiable features of the accessory 16. By way of example, each accessory 16 may be equipped with identifying information such as identifiers 18 indicating available types of connections (electrical, mechanical, fluid). Information regarding the shapes and/or sizes of the acces-sories 16 may also be encoded in signals between the accessory 16 and the identification circuit 24. Based on the information communicated, the control circuitry 28 can determine compatibility, incompatibility, operability, inop-erability, false designation of origin, true designation of origin, or the like. In this way, the management system 30 may automatically detect and control different types of accessories 16.

It is contemplated that other wireless protocols may be employed for identification of the accessory 16, such as Bluetooth®, Bluetooth-low-energy (BLE), ZigBee®, Z-wave®, or any other wireless communication protocol. In some examples, the wireless communication protocol is a low power feature that is "woken up" when a user 22 is detected approaching the vehicle 10. In response to the wake-up signal, the RFID detection (or other wireless iden-tification method) algorithm may be executed by the iden-tification circuit 24. In this way, power consumption of the management system 30 may be limited and/or optimized.

Still referring to FIG. 2, the control circuitry 28 includes a controller 54 having a processor 56 and a memory 58. The memory 58 is configured to store instructions that, when executed by the processor 56, cause the controller 54 to interact with the detection circuit 20, the identification circuit 24, and other circuitry of the management system 30 to optimally manage the accessory 16 and/or connection between the center console 12 and the accessory 16. For example, as previously described, the center console 12 can include an interface 14 that can mechanically, electrically, and/or fluidly connect with the accessory 16 and serve to dock the accessory 16 to the center console 12. The sensing circuit 46 is provided for detecting alignment of the acces-sory 16 with the interface 14. The sensing circuit 46 can include a position sensor 60, such as an electrical switch, that electrically closes in response to mechanical interaction and/or alignment of the accessory 16 with the interface 14.

The management system 30 can also include lights 62, the display 26, and a climate control system 64 for the vehicle 10 or local to the center console 12. Accordingly, the climate control system 64 may be a local climate control system 64 or a vehicle 10-wide climate control system 64 having one or more heating/cooling circuits for heating/cooling the accessory 16 when the accessory 16 is operably coupled with the interface 14. The lights 62, which may include light-emitting diodes or any other lighting device, may be arranged in a target area 66 proximate to the center console 12 for illuminating a target area 66 for installing the acces-sory 16, as will be described in the foregoing figures. Accordingly, the control circuitry 28 may process informa-tion from the detection circuit 20, the identification circuit 24, and the server 48, and control one or more of the devices, such as the lights 62, the display 26, and/or the climate control circuitry 28. The interface 14 can include both inputs and outputs, as will be described further herein.

Figure 3:
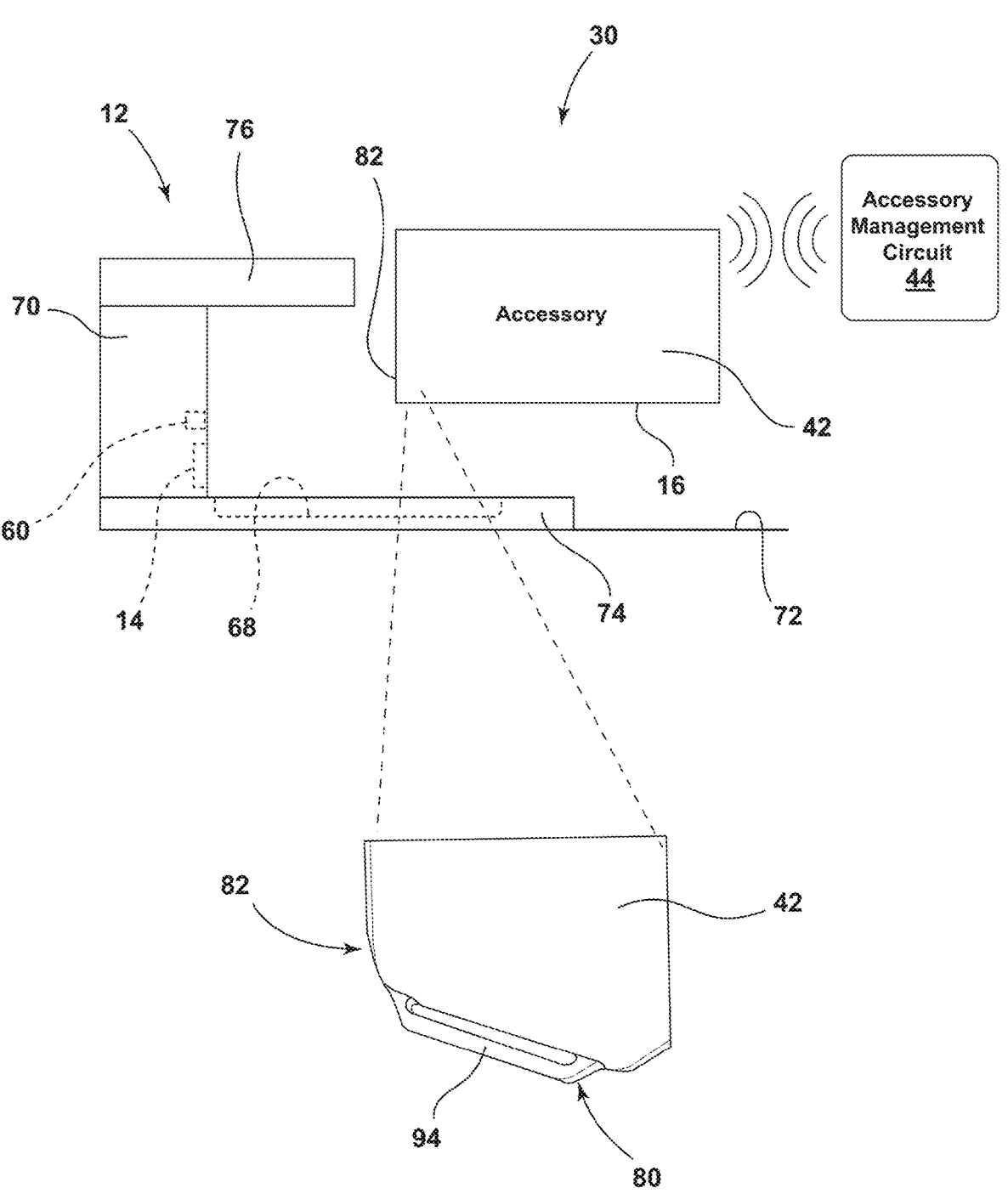
FIG. 3 is a side plan view of a center console configured to receive at least one accessory that includes a striker feature interacting with a portion of the center console.
Figure 4:
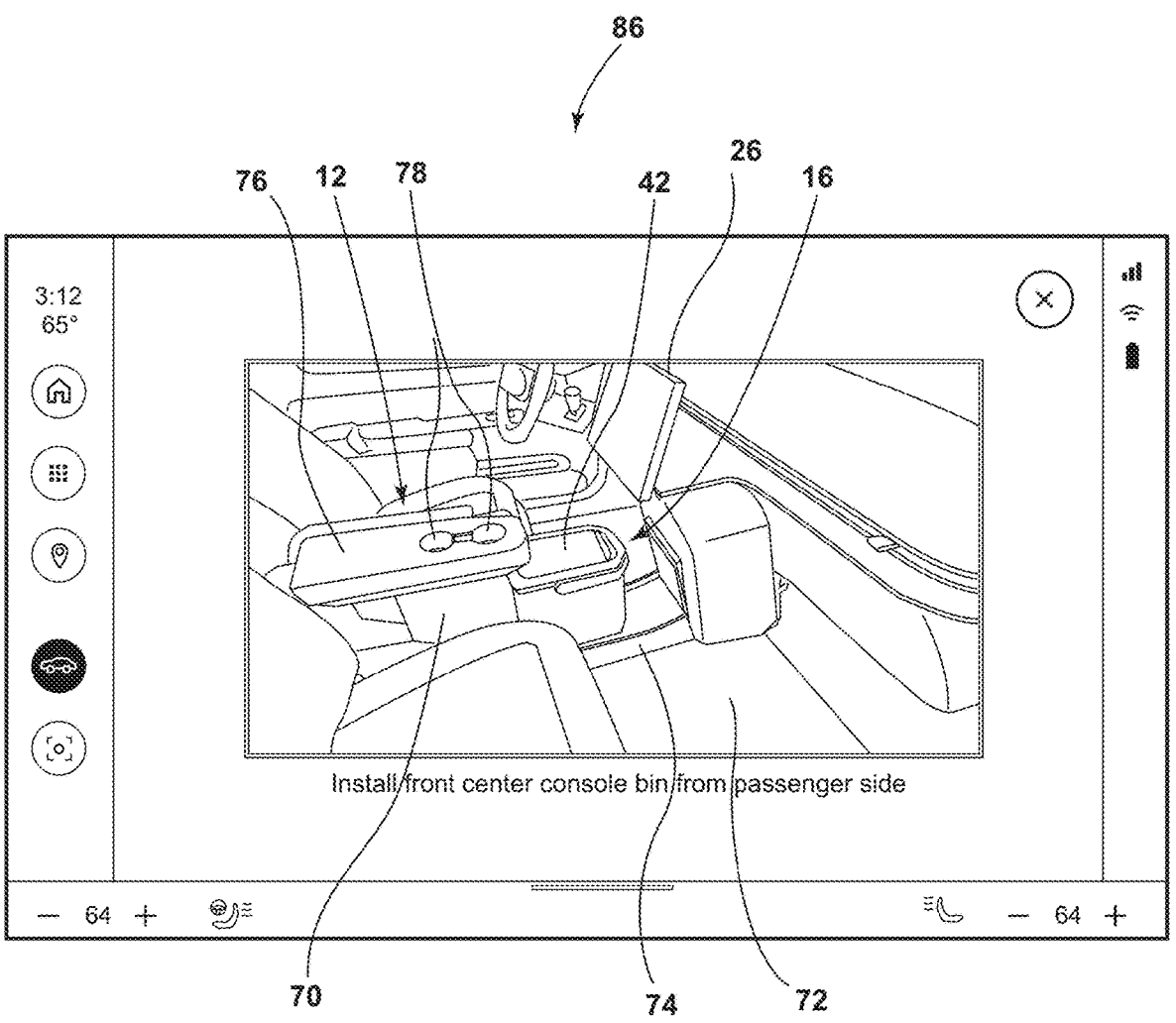
FIG. 4 is an exemplary image of a display configured to guide a user to install at least one accessory into the center console according to one example.
Figure 5:
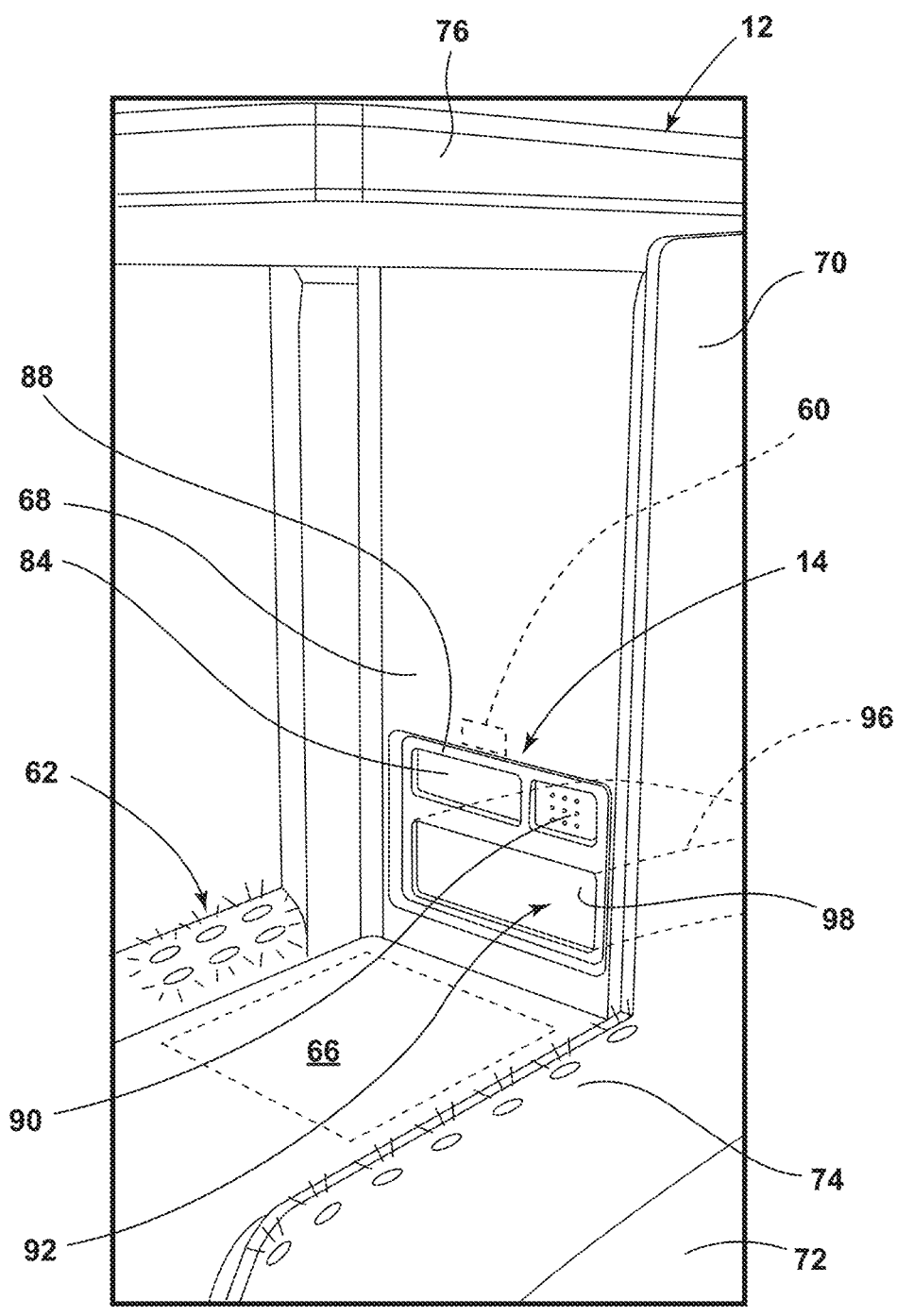
FIG. 5 is a perspective view of a center console configured to receive at least one accessory and including and interface for interacting with do you at least one accessory.

Referring now to FIGS. 3-5, the center console 12 is demonstrated defining a receptacle 68 configured to receive the accessory 16. The console includes a central support 70 operably coupled with a floor 72 of the vehicle 10 via a base 74. The central support 70 supports an upper portion 76 of the center console 12 that may support arms of the user 22

(e.g., a driver and/or a passenger), cup holders 78, phone holders, compartments for storage, or the like. In some examples, a charging port may be provided, such as a universal serial bus (USB) report that may provide power and/or data connectivity between the mobile device 40 and the vehicle 10.

The interface 14 of the center console 12 may be disposed adjacent to the receptacle 68 and provide for mechanical, electrical, and/or fluid communication with the accessory 16. For example, the accessory 16 may include a striker 80 feature along a lower portion 82 of the accessory 16 that is configured to interact with a catch 84 to mechanically secure the accessory 16 with the vehicle 10. Other connections may be provided, as will be described with respect to FIG. 5. With continued reference to FIG. 3, the accessory management circuit 44 may be in wireless communication with the accessory 16. For example, the previously described identification circuit 24 may be actively identifying the accessory 16, and the accessory management circuit 44 may present instructions, or indications, for installation of the accessory 16 via the display 26.

Referring now to FIG. 4, an exemplary user interface (UI 86) demonstrates an instruction for the accessory 16 to be installed with the center console 12. Accordingly, various pictographic representations, words, or other communication may be indicated at the UI 86 to indicate to the user 22 how to install the specific accessory 16 identified by the identification circuit 24*ry*. For example, while one accessory 16 is demonstrated throughout the figures, various accessories 16 having different shapes, models, manufacturers, or other properties may be configured to interact with the interface 14 and install with the console. Thus, the memory 58 of the control circuitry 28 may store various images and/or instructions demonstrating installation of a plurality of the accessories 16. In this way, a detailed guide of how to install a target accessory 16 identified by the identification circuit 24*ry* may be presented at the display 26.

Referring now to FIG. 5, the target area 66 for the accessory 16 is demonstrated in the receptacle 68 defined by the base 74 of the center console 12 and generally aligned with the interface 14. The lights 62 may surround or otherwise be configured to illuminate the target area 66 in response to a signal from the control circuit. For example, upon detection of a compatible accessory 16, the controller 54 may activate the lights 62 with a flashing sequence to indicate placement of the accessory 16. The interface 14 includes a mechanical interface 88 that locks the accessory 16 with the center console 12, an electrical interface 90 that electrically couples the accessory 16 with the center console 12, and a fluid interface 92 that fluidly couples the accessory 16 with the climate control system 64. This configuration is merely exemplary on non-limiting. For example, in other configurations, only one or some of the mechanical interface 88, the electrical interface 90, and the fluid interface 92 is provided.

The mechanical interface 88 can include the catch 84 that interacts with the striker 80 or other mechanical features of the accessory 16 to secure the accessory 16 to the vehicle 10. For example, a hook or other mechanism can move to a locked position in response to the catch 84 receiving the striker 80. The catch 84 may be electronically controlled via the control circuitry 28, which may activate the catch 84 in response to movement of the catch 84 or other mechanism of the catch 84. Accordingly, the sensing circuit 46 may be operably coupled with the mechanical interface 88 to detect engagement/alignment of the accessory 16 with the mechanical interface 88. For example, the striker 80 can include a bar 94 the engages the catch 84 and moves one or more parts of the catch 84 to cause a position sensor 60 to electrically close. The control circuitry 28 can detect closing of the position sensor 60 and, in response, communicate a signal to move the hook to secure the bar 94. For example, a solenoid, a valve, a motor, or another electro-mechanical device can be energized to lock the accessory 16.

The electrical interface 90 may include a power and/or data bus for powering and/or communicating with one or more components of the accessory 16 for example, in addition to the identifier 18 of the accessory 16, a validation circuit may be provided in the accessory 16 that communicates an indication of identity over wired connection following coupling of the electrical interface 90. For example, the electrical interface 90 may include a male part that receives a female part on the accessory 16, or vice versa. Accordingly, the accessory 16 can plug into the electrical interface 90 to exchange data and/or power.

In addition or as an alternative to validation over wired communication, the electrical interface 90 may provide power to one or more cooling or heating elements for cooling/heating the accessory 16. For example, if the accessory 16 is a self-contained cooling device (active cooler), the accessory 16 may cool contents of the accessory 16 using electrical power from the electrical interface 90.

Still referring to FIG. 5, a conduit 96 or other tubing may be provided within the center console 12 for fluid communication with the climate control system 64. For example, the conduit 96 may extend within a body of the center console 12 and into the floor 72 of the vehicle 10 to return to the climate control system 64. The climate control system 64 can include one more baffles and/or heat exchangers for selectively providing heated or cooled air to the accessory 16 when the accessory 16 is connected with the interface 14. For example, the fluid interface 92 can include a door 98 that opens in response to the accessory 16 engaging the interface 14. For example, the door 98 may be a hinged door 98 that is biased toward a closed position that is pushed open by the accessory 16. Accordingly, when the accessory 16 is connected with the interface 14, an internal environment of the accessory 16 may be climate controlled.

In general, interaction between the accessory 16 and the interface 14 may be controlled by the accessory management circuit 44 previously described. For example, incompatible accessories 16 may be detected using the identification circuit 24 and one or more of the features of the interface 14 may be limited from completing connection with the vehicle 10. For example, the control circuitry 28 may limit activation of the catch 84 to lock the accessory 16 with the vehicle 10 in response to detection of an incompatible accessory 16. Further, or alternatively, other connections of the interface 14 may be limited from interfacing with the interface 14. For example, in a spoofing scenario in which the identification circuit 24 detects a valid accessory 16, upon electrical connection at the electrical interface 90 with the accessory 16, the validation circuit may serve as a backup check to confirm compatibility of the accessory 16 with the interface 14. By way of example, an unapproved manufacturer of the accessory 16 may manufacture an accessory 16 with a spoofed identifier 18 while being limited from spoofing the validation circuit which may be detected by the control circuitry 28 upon wired communication at via the electrical interface 90.

Figure 6:
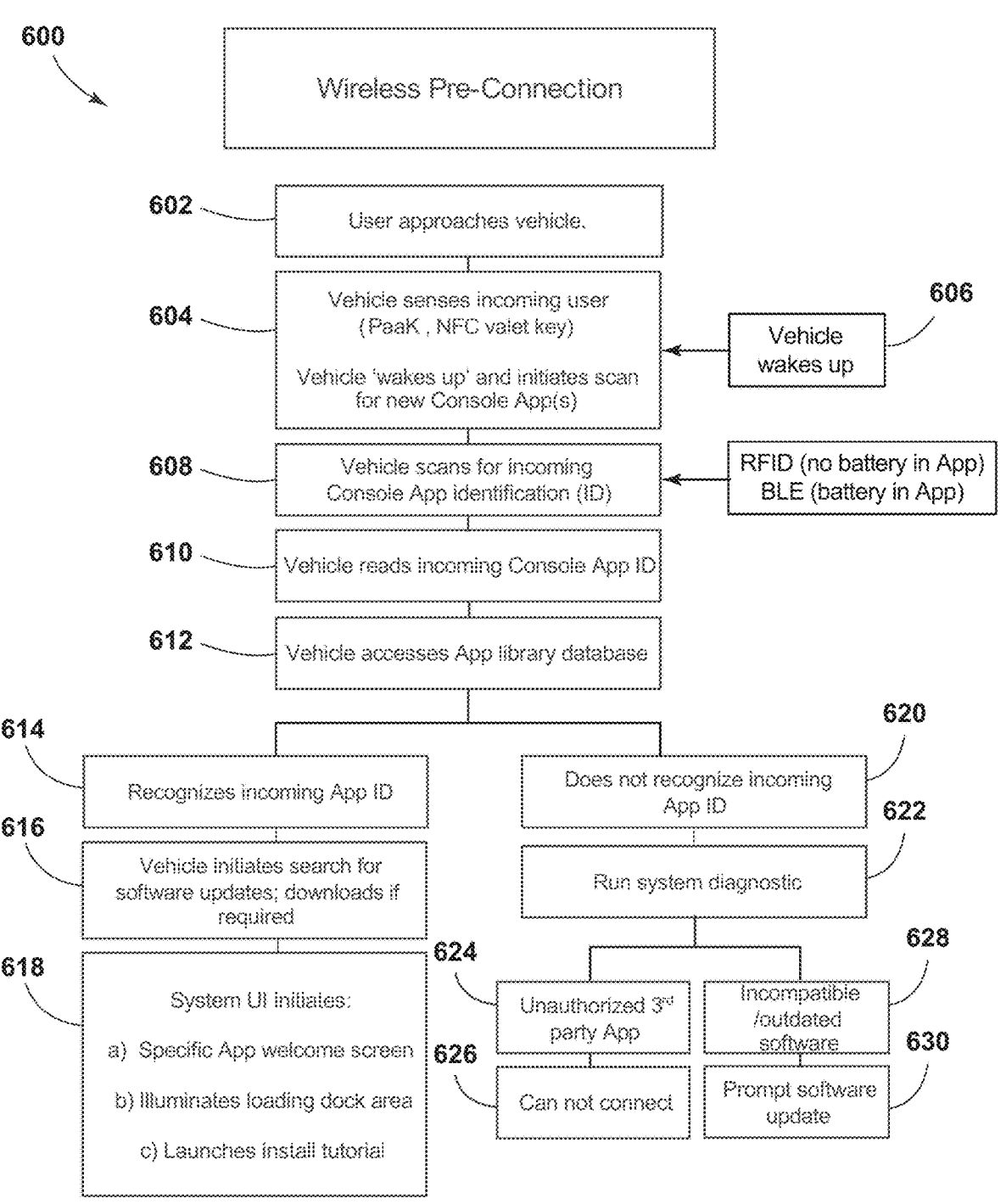
FIG. 6 is a flow diagram of an exemplary process for managing accessory operability with a vehicle.
Figure 7:
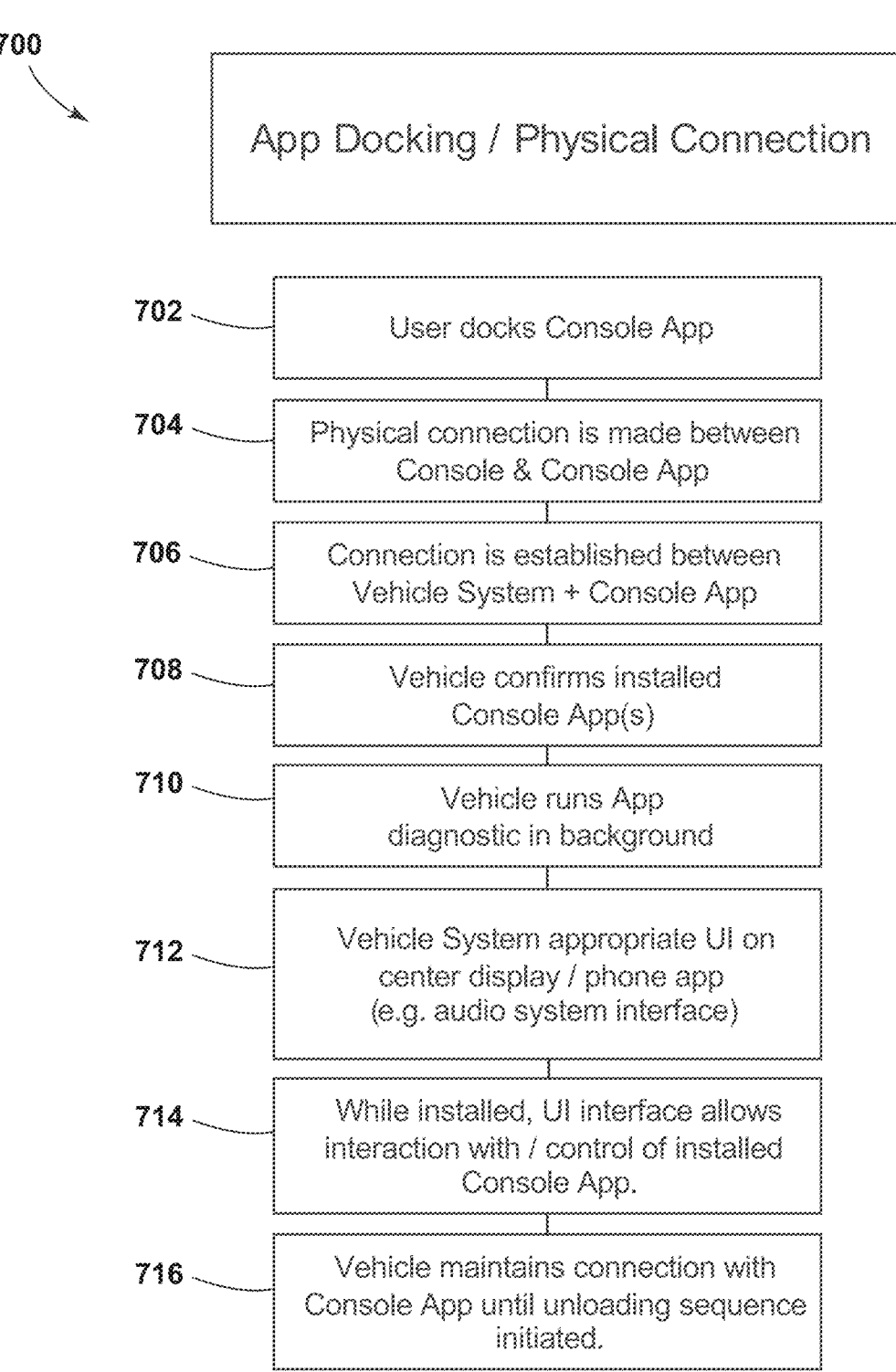
FIG. 7 is a flow diagram of an exemplary process for managing an accessory coupled to the center console of a vehicle.

As will to be described further in reference to FIGS. 6 and 7, in addition to anti-spoofing measures, the interface 14 may further provide for detection of out-of-date software and provide for automatic downloading and/or requesting for downloading of updated software to expand a list or database 74 of compatible devices. For example, the vehicle 10 incorporating the center console 12 and/or interface 14 may be manufactured at a first date, and future upfit accessories 16 may be manufactured at a second date later than the first date. Accordingly, a software update may be required for interfacing with the center console 12. Thus, active tracking and updating of software revisions may be provided by access to the server 48 via the network 50.

Referring now to FIG. 6, a first method 600, or process, carried out by the management system 30 includes a pre-connection stage via wireless communication. The first method includes sensing a user 22 approaching the vehicle 10 at step 602. In response, the control circuitry 28 communicates a signal to the identification circuit 24 to wake up or initiate an identification algorithm executed by the identification circuit 24 at step 604. At step 608, the identification circuit 24 scans for the accessory 16 in order to detect the identifier 18 (e.g., an RFID identifier 18, a response signal via Bluetooth). While BLE and RFID are presented at step 608 as possible communication methods, other communication protocols described herein may be implemented for scanning of the accessory 16. At step 610, the identification circuit 24 reads the identifier 18. At step 612, the control circuitry 28 searches the memory 58 and/or a database 74 at the server 48 to recognize the identifier 18.

If the control circuitry 28 recognizes the identifier 18 and it is classified as a compatible device (step 614), the control circuitry 28 nonetheless communicates, via the network 50, to the remote server 48 to search for software updates for the management system 30 (step 616). Concurrently, or following the communication to the server 48, the control circuitry 28 communicates an instruction to the display 26 to indicate installation of the accessory 16 to the interface 14 based on the particular ID (step 618). For example, the control circuitry 28 can select between a plurality of different screens corresponding to different accessories 16 compatible with the vehicle 10. The screens may include motion arrows and/or a sequence of images demonstrating a time lapse video indicating steps or instructions for installation of the given accessory 16. The control circuitry 28 may further activate the lights 62 during when the instructions are presented at the UI 86 to guide the user 22 to the area for to install the accessory 16.

It is contemplated that other instructions may be presented at the display 26 relevant to the operation of the given accessory 16. For example, based on the identity of the detected accessory 16, electrical and/or fluid communication with the accessory 16 may be initiated. For example, the climate control system 64 may heat or cool the accessory 16 based on the identity of the accessory 16. Further, other options specific to the accessory 16 identified may be presented at the display 26 for manual control over environmental conditions and/or electrical conditions for interaction with the accessory 16.

If the control circuitry 28 does not recognize the identifier 18 of the accessory 16 (step 620), the control circuitry 28 may run a system diagnostic to classify the incompatibility as due to unauthorized make or model, or legacy/newer model that is otherwise compatible (step 622). If an unauthorized make or model is detected (step 624), the method includes indicating at the display 26 that the given accessory 16 cannot connect (step 626). Further, the locking of the accessory 16 with the center console 12 may be limited (e.g., the mechanical interface 88 may be limited) from controlling the catch 84 in either an automatic or manual operating mode. Stated differently, in some examples, classification of the incompatible accessory 16 as unauthorized may limit the user 22 from activating the catch 84 manually to override the unauthorized use.

If the control circuitry 28 categorizes the incompatibility as a result of legacy/outdated products or new/upfit products (step 628), the control circuitry 28 may communicate with the server 48 to download software to allow interaction with outdated or updated makes/models that are otherwise authorized. The user 22 can be prompted for the software update at step 630.

Referring now to FIG. 7, a second method, or process, carried out by the management system 30 includes the physical docking of the accessory 16 with the interface 14 and communication thereafter. At step 702, the user 22 docs the accessory 16. Add step 704, following classification as a compatible device, the control circuitry 28 initiates physical connection with the interface 14 (e.g., the mechanical interface 88). For example, the control circuitry 28 may communicate a signal to the catch 84 to move to a closed position to lock with the striker 80. At step 706, electrical connections with the electrical interface 90 and the accessory 16 are initialized via initialization signals between the control circuitry 28 and the accessory 16. At step 708, the control system searches for updates at the server 48 to provide optimal operational features for the accessory 16. At step 710, various diagnostics and/or checks for proper operation of the accessory 16 are communicated between the control circuitry 28 and the accessory 16 via the electrical interface 90. For example, the validation circuit previously described may be in communication with the control circuitry 28 to validate compatibility and/or optimal operation.

At step 712, the display 26 is updated to indicate the corresponding accessory 16 throughout operation with the accessory 16. For example, the control circuitry 28 may search for and select a plurality of screens for the UI 86 at the display 26 to show pictures and/or video of the given accessory 16 identified by the identification circuit 24$_{ry}$ and/or the wired connection. Stated differently, the memory 58 can include various sets of images and/or video demonstrating installation and/or operations specific to this particular make/model of the accessory 16 identified. It is contemplated that the user interface may also, or alternatively, include audio instructions for guiding the user 22 for installation and operation of the accessory 16 to the interface 14.

At step 714, while the accessory 16 is installed and connected with the interface 14, the UI 86 provides control by the user 22 over the accessory 16. For example, climate control, such as temperature, humidity, or another climate feature may be controlled at the UI 86. Because the interface 14 may be operable with a plurality of different accessories 16 with some having climate control and others lacking climate control, the set of screens selected by the control circuitry 28 may be specific to the make/model of the accessory 16 identified, and climate control may be limited to those models enabled with climate control. At step 716, visual and/or audio indications may be provided by the user interface to indicate an unloading sequence to disconnect the accessory 16 from the interface 14. For example, upon a key-off scenario (ignition off/power off), the display 26 can update to an indication to remove the accessory 16 and provide instructions to do so.

In general, the present management system 30 may provide for a dynamic operation among a plurality of different accessories 16 that may be operable with a common interface 14 of the center console 12. Further, the present management system 30 may provide for anti-spoofing measures and enhanced operation of the accessory 16 when installed with the center console 12.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A vehicle comprising:
a center console that includes an interface;

at least one accessory configured for installation to the center console via the interface and including an identifier;
a detection circuit configured to detect a user approaching the vehicle;
an identification circuit configured to determine the identifier in response to a scanning command;
a display that indicates instructions for the installation of the at least accessory in response to an indication signal; and
control circuitry in communication with the detection circuit, the identification circuit, and the display, and configured to communicate the scanning command in response to detection of the user approaching the vehicle and communicate the indication signal based on detection of the identifier, wherein the control circuitry is configured to compare the identifier to identification information corresponding to compatible accessories and classify the at least one accessory as compatible or incompatible based on the comparison, and wherein the interface includes a mechanical interface configured to lock the at least one accessory to the center console in response to alignment of the at least one accessory with the interface and classification of the at least one accessory as compatible.

2. The vehicle of claim 1, wherein the control circuitry is configured to communicate the indication signal further in response to classification of the at least one accessory as compatible.

3. The vehicle of claim 1, further comprising:
a light configured to illuminate an area proximate to the console assembly that receives the at least one accessory in response to classification of the at least one accessory as compatible.

4. The vehicle of claim 2, further comprising:
a sensing circuit that detects alignment of the at least one accessory with the interface.

5. The vehicle of claim 4, wherein the control circuitry is configured to limit activation of the mechanical interface in response to alignment of the at least one accessory with the interface and classification of the at least one accessory as incompatible.

6. The vehicle of claim 4, wherein the interface includes an electrical interface that electrically couples at least one accessory with the control circuitry, wherein the control circuitry is configured to control an electrical component of the accessory when the at least one accessory is locked with the interface.

7. The vehicle of claim 1, wherein the display is configured to indicate incompatibility in response to classification of the at least one accessory as incompatible.

8. The vehicle of claim 1, wherein the control circuitry is in communication with a server remote from the vehicle that determines software update availability in response to an update request, wherein the control circuitry is configured to communicate the update request in response to classification of the at least one accessory as compatible.

9. The vehicle of claim 8, wherein the control circuitry is configured to determine an incompatibility source as outdated or unknown and communicate the update request in response to determination of the incompatibility source as outdated.

10. The vehicle of claim 1, further comprising:
a climate control system, wherein the interface includes a port in fluid communication with the climate control system and configured to provide climate-controlled air into the at least one accessory when the at least one accessory is connected to the interface.

11. A vehicle comprising:

a center console that includes an interface;

at least one accessory configured for installation to the center console via the interface and including an identifier;

a detection circuit configured to detect a user approaching the vehicle;

an identification circuit configured to determine the identifier in response to a scanning command;

a display that indicates instructions for the installation of the at least accessory in response to an indication signal; and control circuitry in communication with the detection circuit, the identification circuit, and the display, and configured to:

communicate the scanning command in response to detection of the user approaching the vehicle;

communicate the indication signal based on detection of the identifier;

compare the identifier to identification information corresponding to compatible accessories; and classify the at least one accessory as compatible or incompatible based on the comparison, wherein the control circuitry is configured to communicate the indication signal further in response to classification of the at least one accessory as compatible, and wherein the interface includes a mechanical interface configured to lock the at least one accessory to the center console in response to alignment of the at least one accessory with the interface and classification of the at least one accessory as compatible.

12. The vehicle of claim 11, further comprising:

a light configured to illuminate an area proximate to the console assembly that receives the at least one accessory in response to classification of the at least one accessory as compatible.

13. The vehicle of claim 11, further comprising:

a sensing circuit that detects alignment of the at least one accessory with the interface.

14. The vehicle of claim 13, wherein the control circuitry is configured to limit activation of the mechanical interface in response to alignment of the at least one accessory with the interface and classification of the at least one accessory as incompatible.

15. The vehicle of claim 13, wherein the interface includes an electrical interface that electrically couples at least one accessory with the control circuitry, wherein the control circuitry is configured to control an electrical component of the accessory when the at least one accessory is locked with the interface.

16. The vehicle of claim 11, wherein the display is configured to indicate incompatibility in response to classification of the at least one accessory as incompatible.

17. A vehicle comprising:

a center console that includes an interface;

at least one accessory configured for installation to the center console via the interface and including an identifier;

an identification circuit configured to determine the identifier in response to a scanning command;

a display that indicates instructions for the installation of the at least accessory in response to an indication signal; and control circuitry in communication with the identification circuit and the display and configured to:

communicate the scanning command;

compare the identifier to identification information corresponding to compatible accessories;

classify the at least one accessory as compatible or incompatible based on the comparison; and communicate the indication signal based on detection of the identifier, wherein the interface includes a mechanical interface configured to lock the at least one accessory to the center console in response to alignment of the at least one accessory with the interface and classification of the at least one accessory as compatible.

18. The vehicle of claim 17, wherein the control circuitry is in communication with a server remote from the vehicle that determines software update availability in response to an update request, wherein the control circuitry is configured to communicate the update request in response to classification of the at least one accessory as compatible.

* * * * *